United States Patent [19]

Sotani et al.

[11] Patent Number: 4,955,361
[45] Date of Patent: Sep. 11, 1990

[54] HOT PLATE

[75] Inventors: Junji Sotani; Chiyoshi Sasaki, both of Yokohama, Japan

[73] Assignee: The Furukawa Electric Co., Ltd., Tokyo, Japan

[21] Appl. No.: 312,035

[22] Filed: Feb. 16, 1989

[30] Foreign Application Priority Data

Oct. 31, 1986 [JP] Japan .................................. 61-259762

[51] Int. Cl.$^5$ ............................................. F28D 21/00
[52] U.S. Cl. ..................... 126/374; 126/378; 126/389; 126/390; 165/104.21
[58] Field of Search ............... 126/374, 351, 389, 390, 126/39 H, 211, 214 R, 378; 165/104.26, 104.21

[56] References Cited

U.S. PATENT DOCUMENTS

| | | | |
|---|---|---|---|
| 2,595,527 | 5/1952 | Kells et al. | 126/378 |
| 3,791,372 | 2/1974 | Hatsopoulos et al. | 165/104.26 |
| 3,815,575 | 6/1974 | Danis | 165/104.21 |
| 3,853,112 | 12/1974 | Lazaridis et al. | 165/104.26 |
| 3,968,787 | 7/1976 | Basiulis | 126/390 |
| 4,245,147 | 1/1981 | Cummings et al. | 126/390 |
| 4,445,428 | 5/1984 | Buford | 126/390 |
| 4,660,542 | 4/1987 | Scherer | 126/378 |

Primary Examiner—Carroll B. Dority
Attorney, Agent, or Firm—Frishauf, Holtz, Goodman & Woodward

[57] ABSTRACT

A hot plate comprises a rectangular lower section having a heating chamber formed therein, and an upper section erected upward at the back end of the lower section and having a gas chamber formed therein. The gas chamber has a gas staying or receiving space located above the heating chamber. A liquid contained in the heating chamber is heated by a gas burner so that it is gasified into heated gas to heat a heating surface of the lower section of the hot plate. Non-condensed gas created from the heated liquid is gathered in the gas staying or receiving space.

22 Claims, 2 Drawing Sheets 4,955,361

HOT PLATE

BACKGROUND OF THE INVENTION

1. Field of the Invention

The present invention relates to a hot plate heated by, for example, gas and intended for business use.

2. Description of the Related Art

Most of the hot plates used for business purpose are of the gas-heated type because they are low in cost.

A hot plate used for business purpose comprises a heating metal plate, such as iron or stainless steel, and is used in those stores such as chain stores where it is needed that a large number of hamburgers or steaks are cooked at a time. In order to keep these pieces of food constant in their quality, therefore, the temperature must be certain (or about 180° C.) all over the hot plate. The heating means such as the gas burner located under the hot plate is therefore replaced in such a case by such a special one that can keep the hot plate almost unchanged in temperature, its temperature may be different from a desired one by 25° C.+25° C. all over it. In addition, the hot plate is usually made about 30 mm thick so as not to rapidly reduce its surface temperature when a large number of hamburgers or steaks are placed on it.

When the conventional hot plates are used, however, the following drawbacks are caused.

(1) When the surface temperature is different by several 10° C. here and there on the hot plate, pieces of food which are cooked cannot be certain in their quality.

(2) It takes about 30 minutes to increase the surface temperature of the hot plate to a certain value because the hot plate is thick.

(3) When hamburgers or the like are placed on the hot plate, the surface temperature of the hot plate is rapidly reduced at the parts on which hamburgers are placed. It takes therefore some time to increase the surface temperature at each part to its original level.

(4) Combustion efficiency is low.

SUMMARY OF THE INVENTION

The object of the present invention is to provide a hot plate capable of keeping its surface temperature certain all over it and being more rapidly re-heated even when its surface temperature is partially reduced by hamburgers or the like placed on it.

DETAILED DESCRIPTION OF THE PREFERRED EMBODIMENTS

Figure 1:
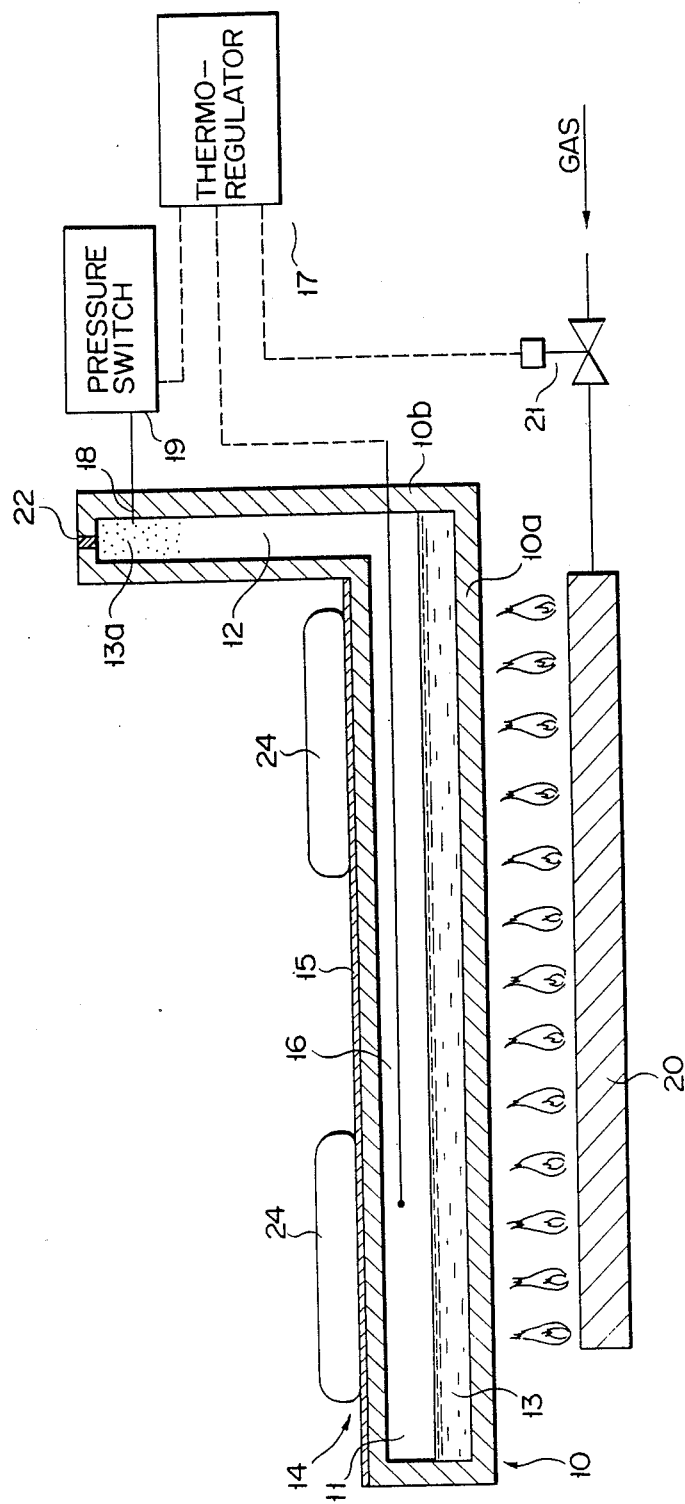
FIG. 1 shows a sectional view of the whole of a hot plate according to the present invention.

In FIG. 1, numeral 10 represents a heat pipe made by a metal plate such as a stainless steel plate (SUS 304), 4 mm thick, and having a hollow portion sealed from the outside. Heat pipe 10 includes a rectangular lower section 10a, flat in the horizontal direction, and an upper section 10b erected upward at the back end of rectangular section 10a and flat in the vertical direction. Heating chamber 11 in which liquid 13 is contained is formed in rectangular section 10a and a gas chamber which is communicated with heating chamber 11 is formed in erected section 10b. Liquid 13 may be any of those which are used for the usual hot plates such as "DOWTHERM A" (liquid of diphenyl and diphenyl ether mixed), alcohol and water.

Rectangular section 10a of heat pipe 10 comprises upper and lower plates and the upper plate cooperates with surface plate 15 thereon to form heating plate 14 which has a flat heating surface. Alternately, heating plate 14 may be made only by the upper plate. Surface plate 15 which is placed on the upper plate may be made of the same material as that of the upper plate. Or it may be made of materials different from that of the upper plate such as clad steel of copper and stainless steel, for example. Further, heating plate 14 may be a combination of cupro nickel and iron, copper and iron or iron and stainless steel. When heating plate 14 is made by plural plates placed one upon the other, as described above, and the upper plate of the heat pipe is partly exposed through surface plate 15 thereon, it can be easily confirmed that surface plate 15 is worn down to form some holes through which the upper plate is exposed. This indicates that the heating plate must be repaired or replaced by a new one. When the heating plate is repaired or replaced by a new one, pieces of food can be previously prevented from contacting the liquid in the heat pipe while they are being cooked. Heating plate 14 may be made by three or more plates.

Temperature sensor 16 comprising a thermocouple, for example, is located above liquid 13 in heating chamber 11 to detect the temperature in heating chamber 11. The output side of this temperature sensor 16 is located outside heat pipe 10 and is connected to a thermoregulator 17 which will be described later.

Pressure sensor 18 is located at the upper portion of gas chamber 12 in erected section 10b of heat pipe 10 to detect the pressure in gas chamber 12 and more particularly the upper portion thereof. The output side of this pressure sensor 18 is located outside heat pipe 10 and is connected to a pressure switch 19 which is opened and closed by the pressure detected and which is connected to thermoregulator 17.

A heating means or gas burner 20, for example, for heating heat pipe 10 is arranged under heat pipe 10. Gas is supplied from a gas source (not shown) to gas burner 20 through electromagnetic valve 21 and gas burner 20 thus heats the heat pipe or liquid 13 therein by its burning gas. Electromagnetic valve 21 is controlled by thermoregulator 17 and when sensor 16 or 18 detects that the temperature or pressure in heat pipe 10 rises higher than a set value, electro-magnetic valve 21 is tightened or closed by thermoregulator 17 to reduce the amount of gas supplied or to stop the supply of gas.

Numeral 22 in FIG. 1 represents a material through which non-condensed gas is allowed to permeate and which is filled in a through-hole formed in the top of erected section 10b to communicate a gas-staying space at the upper portion of gas chamber 12 with outside the heat pipe 10. This gas permeable material 22 is made in this case by a piece of palladium which allows hydrogen or non-condensed gas 13a to permeate therethrough. It is preferable that gas permeable material 22 has as large an area as possible to contact with the non-condensed gas. That side of gas permeable material 22 which faces gas chamber 12 is therefore shaped like a cup or tray. When gas permeable material 22 is iron, for example, which has a hydrogen permeability smaller than that of palladium, it is preferable that the iron has a larger area to contact with the non-condensed gas. When this gas permeable material 22 is used, as described above, the non-condensed gas created in heat pipe 10 can escape outside heat pipe 10, thereby preventing heat pipe 10 from being degraded in its performance because of the non-condensed gas created and retained in heat pipe 10.

Numeral 24 in FIG. 1 represents pieces of food such as hamburgers and steaks which are placed on heating plate 14 to be heated and cooked.

The hot plate having the above-described arrangement is heated by heating means 20 to heat and gasify liquid 13 into heated gas, by which the heating surface of heating plate 14 is heated to a predetermined temperature. Liquid 13 is uniformly heated for a short time in heat pipe 10 so that the heating surface of heating plate 14 can be rapidly heated, not irregularly, but to a uniform temperature all over it. In addition, a temperature drop caused when pieces of food are placed on heating plate 14 can be made smaller. Table 1 shows test results obtained from both this hot plate of the present invention and the conventional one whose iron plate is directly heated. As is apparent from Table 1, problems caused by the conventional hot plates can be solved by the hot plate of the present invention.

TABLE 1

|  | Our hot plate | Conventional one |
| --- | --- | --- |
| Time needed to heat the hot plate to a predetermined temperature (180° C.) | 7 minutes | 30 minutes |
| Temperature difference distributed on the heating plate | ±1.5° C. | ±25° C. |
| Temperature drop caused when pieces of hamburgers are placed on the heating plate | 5° C. | 20° C. |

Another example of the hot plate according to the present invention will be described with reference to FIG. 2. Same parts as those in the first example will be represented by same numerals and description of these parts will be omitted.

Figure 2:
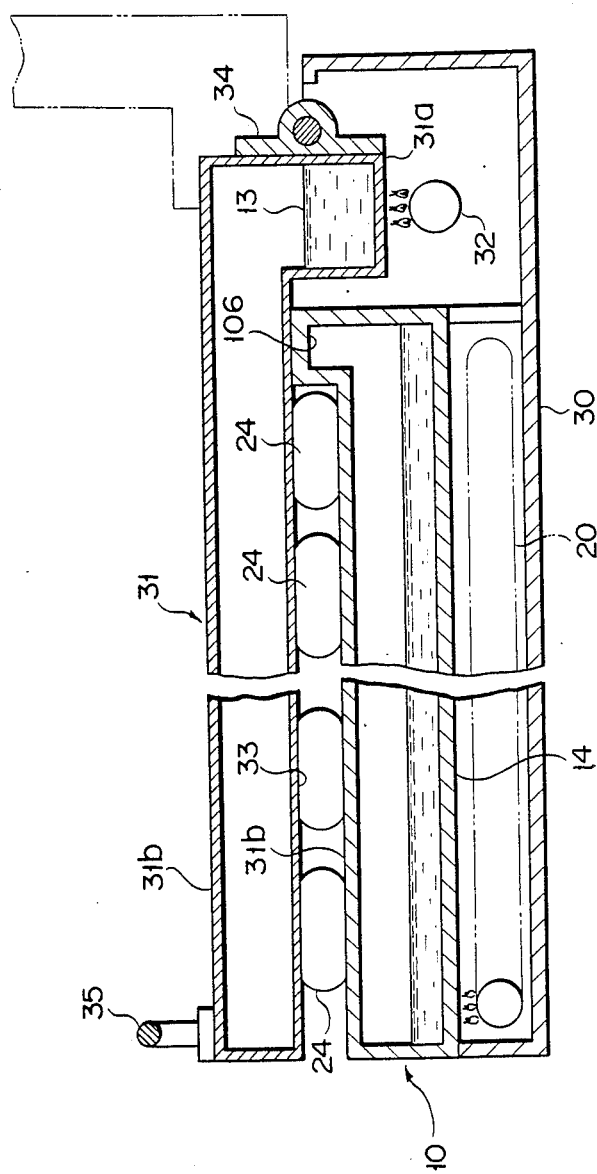
FIG. 2 shows a sectional view of the whole of another hot plate according to the present invention.

Numeral 30 in FIG. 2 denotes a support frame, which supports heat pipe 10 with heating source or means 20 interposed between the support frame and heat pipe 10. Another heat pipe 31 is located above and parallel to heat pipe 10 with a certain interval interposed between two heat pipes 10 and 31. Second heat pipe 31 includes rectangular section 31b located above first heat pipe 10 and flat in the horizontal direction and section 31a projected downward from the back end of rectangular section 31b. Projected section 31a is pivoted on support frame 30 by means of pivot member 34, so that second heat pipe 31 can be swung by 90° from its heating position shown by solid lines to its waiting position shown by a two-dot and dash line. The top of section 106 which is erected upward from the back end of first heat pipe 10 serves as a stopper for holding second heat pipe 31 parallel to first heat pipe 10 with a predetermined interval interposed between them, as shown by solid lines in downwardly FIG. 2. Liquid 13 is contained in projected section 31a of second heat pipe 31 and a second heating source 32 such as the gas burner is located under projected section 31a. Liquid 13 is heated and gasified by heating source 32. The heated gas enters into the chamber defined in the rectangular section of heat pipe 31 to heat heating plate 33 which forms the bottom of heat pipe 31.

Numeral 35 in FIG. 2 represents a handle for swinging second heat pipe 31 around the pivoted point.

It will now be described how pieces of food 24 are heated and prepared by the hot plate shown in FIG. 2. Holding second heat pipe 31 as shown by solid lines, both of heating means 20 and 32 are lit to heat heating plates 14 and 33 to predetermined temperatures (170° C. in the case of first heating plate 14 and 180° C. in the case of second heating plate 33, for example) through liquid 13, and second heat pipe 31 is then swung to that position shown by the two-dot and dash line, grasping handle 35 by hand. Pieces of food 24 to be prepared are placed on first heating plate 14 and second heat pipe 31 is again swung to its heating position shown by solid lines to sandwich pieces of food 24 between first and second heating plates 14 and 33. Pieces of food 24 are thus heated from above and below. This heating is held till pieces of food 24 are completely cooked or baked. The second heat pipe 31 may be once or twice swung upward, depending upon the kind of food to be prepared, in the course of of the cooking process to enable pieces of food 24 to be put upside down.

The hot plate having the above-described arrangement enables pieces of food 24 to be heated from both sides thereof between heating plates 14 and 33 of heat pipes 10 and 31. Therefore, heat emitted from heating plates 14 and 33 which are held adjacent to each other is likely to remain between these heating plates 14 and 33, so that heating efficiency can be enhanced to cook pieces of food 24 in a shorter time. Further, it is hardly needed that pieces of food 24 are turned upside down by means of a cooking tool. Therefore, heating plate 14 is not worn or scraped by the cooking tool and this delays heating plate 14 from becoming thin.

It may be arranged that a section is erected upward from the back end of the rectangular section of second heat pipe 31 to form a gas staying space therein as in erected section 10b of first heat pipe 10. A heat insulating sheet may be placed on the top of the rectangular section of second heat pipe 31 to prevent heat from being discharged from this top of the rectangular section. Second heat pipe 31 may be moved along vertical guide rails, instead of its being swung as described above.

Although the heat pipes have been arranged to keep their heating plates horizontal in the first and second examples of the hot plate, they may be tilted forward by 5 degrees, for example. The heating chamber in the heat pipe may be divided into plural compartments by one or plural partitions. The gas staying or receiving space may be provided in every compartment or made common to all of the compartments in this case.

According to the hot plate of the present invention, the heat pipe is used as the means for heating the heating surface. Therefore, temperature difference cannot be caused all over the heating surface and the heating time can be thus shortened. In addition, the gas chamber communicated with and located above the heating chamber in the heat pipe allows the non-condensed gas caused when the liquid is gasified to stay in this gas chamber. As the result, heating efficiency cannot be lowered in the course of the heating process because of the non-condensed gas stayed or received in the heating chamber or adhering to the inner side of that area of the heat pipe which forms the heating surface.

What is claimed is:
1. A hot plate, comprising:

a heat pipe including a heating plate means for receiving a piece to be heated thereon, means defining a heating chamber located under said heating plate means and including a lower section, an upper section extending upward from said lower section and having said chamber therein, and an upper surface having said heating plate means thereon, means defining a gas chamber having a non-condensed gas receiving space located above said heating chamber outside said heating plate means, and means defining a path for communicating said heating chamber with said non-condensed gas receiving space, and wherein said heating plate means comprises plural plates made of different materials and placed one upon the other on said upper surface which serves as a heating surface;

a liquid contained in said heating chamber, the upper level of said liquid being located under and spaced from said heating plate means so as to define an evaporation space between said upper liquid level and said heating plate means; and heating means for heating said liquid in said heating chamber to evaporate said liquid to generate evaporated gas in said evaporation space for heating said heating plate means;

said path defining means communicating said evaporation space with said gas receiving space for transferring non-condensed gas generated from said heated liquid from said evaporation space to said gas receiving space.

2. The hot plate according to claim 1, wherein said heating plate means has an outer periphery, and wherein said non-condensed gas receiving space is located outside the confines of said heating plate means and above said heating plate means.

3. A hot plate, comprising:
a heat pipe including a heating plate means for receiving a piece to be heated thereon, means defining a heating chamber located under said heating plate means, means defining a gas chamber having a non-condensed gas receiving space located above said heating chamber outside said heating plate means, and means defining a path for communicating said heating chamber with said non-condensed gas receiving space;

a liquid contained in said heating chamber, the upper level of said liquid being located under and spaced from said heating plate means so as to define an evaporation space between said upper liquid level and said heating plate means;

heating means for heating said liquid in said heating chamber to evaporate said liquid to generate evaporated gas in said evaporation space for heating said heating plate means;

said path defining means communicating said evaporation space with said gas receiving space for transferring non-condensed gas generated from said heated liquid from said evaporation space to said gas receiving space; and means for communicating said non-condensed gas receiving space in said gas chamber with outside the heat pipe for permitting escape of non-condensed gas gathered in said gas receiving space to the outside of said heat pipe.

4. The hot plate according to claim 3, wherein said means for permitting escape of said gas comprises a through-hole in said heat pipe to communicate said gas receiving space with outside the heat pipe, and a gas permeable material filled in said through-hole.

5. The hot plate according to claim 4, wherein said gas permeable material is palladium.

6. The hot plate according to claim 1, further comprising:
means for detecting the temperature in said heating chamber; and
means for controlling said heating means responsive to the temperature detected by said temperature detecting means.

7. The hot plate according to claim 1, further comprising:
means for detecting the pressure in said heat pipe; and
means for controlling said heating means responsive to the pressure detected by said pressure detecting means.

8. A hot plate, comprising:
a heat pipe including a heating plate means for receiving a piece to be heated thereon, means defining a heating chamber located under said heating plate means, means defining a gas chamber having a non-condensed gas receiving space located above said heating chamber outside said heating plate means, and means defining a path for communicating said heating chamber with said non-condensed gas receiving space;

a liquid contained in said heating chamber, the upper level of said liquid being located under and spaced from said heating plate means so as to to define an evaporation space between said upper liquid level and said heating plate means;

heating means for heating said liquid in said heating chamber to evaporate said liquid to generate evaporated gas in said evaporation space for heating said heating plate means;

said path defining means communicating said evaporation space with said gas receiving space for transferring non-condensed gas generated from said heated liquid from said evaporation space to said gas receiving space;

means for detecting the temperature in said heating chamber;

means for detecting the pressure in said heat pipe; and means for controlling said heating means responsive to at least one of said temperature detected by said temperature detecting means and said pressure detected by said pressure detecting means.

9. A hot plate, comprising:
a heat pipe including a heating plate means for receiving a piece to be heated thereon, means defining a heating chamber located under said heating plate means, means defining a gas chamber having a non-condensed gas receiving space located above said heating chamber outside said heating plate means, and means defining a path for communicating said heating chamber with said non-condensed gas receiving space;

a liquid contained in said heating chamber the upper level of said liquid being located under and spaced from said heating plate means so as to define an evaporation space between said upper liquid level and said heating plate means;

heating means for heating said liquid in said heating chamber to evaporate said liquid to generate evaporated gas in said evaporations pace for heating said heating plate means;

said path defining means communicating said evaporation space with said gas receiving space for transferring non-condensed gas generated from said heat liquid from said evaporation space to said gas receiving space;

another heat pipe having a heating surface opposite to said heating plate means of said first-mentioned heat pipe, said heating surface of said another heat pipe being spa ed from said heating plate means of said first-mentioned heat pipe;

means for movably connecting said another heat pipe to said first-mentioned heat pipe so that it is movable in relation to said first-mentioned heat pipe between a first position wherein said heating surface is opposed to and spaced from said heating plate means and a second position wherein said heating surface is spaced farther away said heating plate means;

a liquid contained in chamber of said another heat pipe; and means for heating and gasifying said liquid in said another heat pipe to heat said heating surface of said another heat pipe.

10. The hot plate according to claim 1, wherein said heating means includes a gas burner.

11. A hot plate, comprising:

a heat pipe including a heating plate means on an upper surface of said heat pipe for receiving a piece to be heated thereon, a lower section defining heating chamber located under said heating plate means, an upper section extending upward from said lower section and defining a gas chamber having a non-condensed gas receiving space located above said heating chamber and means defining a path for communicating said heating chamber with said non-condensed gas receiving space;

a liquid contained in said heating chamber, said liquid being gasified at a predetermined temperature; and heating means for heating said liquid in said heating chamber to satisfy said liquid to generate evaporated gas in said heating chamber for heating said heating plate means;

said path defining means communicating said heating chamber with said gas receiving space for transferring non-condensed gas generated from said heated liquid to said gas receiving space; and said heating plate means comprises a plurality of plates made of different materials and placed one upon the other, said plurality of plates being mounted on said upper surface of said heat pipe.

12. The hot plate according to claim 11, further comprising means for communicating said non-condensed gas receiving space with the outside of said heat pipe for permitting escape of non-condensed gas gathered in said gas receiving space to the outside of heat pipe.

13. The hot plate according to claim 12, wherein said means for permitting escape of said gas comprises a through-hole in said heat pipe to communicate said gas receiving space with outside the heat pipe, and a gas permeable material filled in said through-hole.

14. The hot plate according to claim 13, wherein said gas permeable material is palladium.

15. The hot plate according to claim 11, further comprising:

means for detecting the temperature in said heating chamber; and means for controlling said heating means responsive to the temperature detected by said temperature detecting means.

16. The hot plate according to claim 11, further comprising:

means for detecting the pressure in said heat pipe; and means for controlling said heating means responsive to the pressure detected by said pressure detecting means.

17. The hot plate according to claim 11, further comprising:

means for detecting the temperature in said heating chamber;

means for detecting the pressure in said heat pipe; and means for controlling said heating means responsive to at least one of said temperature detected by said temperature detecting means and said pressure detected by said pressure detecting means.

18. A hot plate, comprising:

a heat pipe including a heating plate means for receiving a piece to be heated thereon, means defining a heating chamber located under said heating plate means, means defining a gas chamber having a non-condensed gas receiving space located above said heating chamber and means defining a path for communicating said heating chamber with said non-condensed gas receiving space;

a liquid contained in said heating chamber, said liquid being gasified at a predetermined temperature;

heating means for heating said liquid in said heating chamber to gasify said liquid to generate evaporated gas in said heating chamber for heating said heating plate means;

said path defining means communicating said heating chamber with said gas receiving space for transferring non-condensed gas generated from said heated liquid to said gas receiving space; and means for communicating said non-condensed gas receiving space with the outside of said heat pipe for permitting escape of non-condensed gas gathered in said gas receiving space to the outside of said heat pipe.

19. The hot plate according to claim 18, wherein said means for permitting escape of said gas comprises a through-hole in said heat pipe to communicate said gas receiving space with outside the heat pipe, and a gas permeable material filled in said through-hole.

20. The hot plate according to claim 19, wherein said gas permeable material is palladium.

21. A hot plate, comprising:

a first heat pipe including a heating plate means for receiving a piece to be heated thereon, means defining a heating chamber located under said heating plate means, means defining a gas chamber having a non-condensed gas receiving space located above said heating chamber, and means defining path for communicating said heating chamber with said non-condensed gas receiving space;

a liquid contained in said heating chamber, said liquid being gasified at a predetermined temperature;

heating means for heating said liquid in said heating chamber to gasify said liquid to generate evaporated gas in said heating chamber for heating said heating plate means;

said path defining means communicating said evaporation space with said gas receiving space for transferring non-condensed gas generated from said heated liquid to said gas receiving space;

a second heat pipe having a heating surface opposite to said heating plate means of said first heat pipe, said heating surface of said second heat pipe being spaced from said heating plate means of said first heat pipe;

means or movably connecting a said second heat pipe to said first heat pipe so that it is movable in relation to said first-mentioned heat pipe between a first position wherein said heating surface is opposed to and spaced and from said heating plate means and a second position wherein said heating surface is spaced farther away from said heating plate means;

a liquid contained in a chamber of said second heat pipe; and means for heating and gasifying said liquid in said chamber of said second heat pipe to heat said heating surface of said second heat pipe.

22. The hot plate according to claim 21, further comprising means for communicating said non-condensed gas receiving space with the outside of said heat pipe for permitting escape of non-condensed gas gathered in said gas receiving space to the outside of heat pipe.

* * * * *

UNITED STATES PATENT AND TRADEMARK OFFICE
CERTIFICATE OF CORRECTION

PATENT NO. : 4,955,361
DATED : September 11, 1990
INVENTOR(S) : Junji SOTANI et al It is certified that error appears in the above-identified patent and that said Letters Patent is hereby corrected as shown below:

Title page, Under Section [30]

within "Foreign Applications Priority Data"

delete "Oct. 31, 1986 (JP) Japan............... 61-259762"

Signed and Sealed this

Twenty-eighth Day of July, 1992

*Attest:*

DOUGLAS B. COMER

*Attesting Officer*  *Acting Commissioner of Patents and Trademarks*